United States Patent [19]
Petroni et al.

[11] Patent Number: 6,098,040
[45] Date of Patent: Aug. 1, 2000

[54] METHOD AND APPARATUS FOR PROVIDING AN IMPROVED FEATURE SET IN SPEECH RECOGNITION BY PERFORMING NOISE CANCELLATION AND BACKGROUND MASKING

[75] Inventors: Marco Petroni, Cote St-Luc; Steven Douglas Peters, Pointe-Claire, both of Canada

[73] Assignee: Nortel Networks Corporation, Montreal, Canada

[21] Appl. No.: 08/965,781

[22] Filed: Nov. 7, 1997

[51] Int. Cl.$^7$ .................................................. G10L 15/20
[52] U.S. Cl. .............................................................. 704/234
[58] Field of Search .................................... 704/227, 248, 704/253, 201, 234, 224, 221, 233

[56] References Cited

U.S. PATENT DOCUMENTS

| | | | |
|---|---|---|---|
| 4,164,025 | 8/1979 | Dubnowski et al. | 707/533 |
| 4,630,304 | 12/1986 | Borth et al. | 381/94.3 |
| 4,751,737 | 6/1988 | Gerson et al. | 704/243 |
| 4,797,910 | 1/1989 | Daudelin | 379/88.01 |
| 4,897,878 | 1/1990 | Boll et al. | 704/233 |
| 4,918,732 | 4/1990 | Gerson et al. | 704/233 |
| 4,959,855 | 9/1990 | Daudelin | 379/213 |
| 4,979,206 | 12/1990 | Padden et al. | 379/88.01 |
| 5,050,215 | 9/1991 | Nishimura | 704/256 |
| 5,052,038 | 9/1991 | Shepard | 379/88.09 |
| 5,086,479 | 2/1992 | Takenaga et al. | 382/157 |
| 5,091,947 | 2/1992 | Ariyoshi et al. | 704/246 |

(List continued on next page.)

OTHER PUBLICATIONS

Furui, Digital Speech Processing, Synthesis, and Recognition, Marcel Dekker, Inc., New York, (1989), pp. 55–56, 225–232, 1989.

"Putting Speech Recognition to Work in the Telephone Network," IEEE Computer Society, vol. 23, No. 8, Aug. 1990, pp. 335–341.

*Dynamic Adaptation of Hidden Markov Model for Robust Speech Recognition*, IEEE International Symposium on Circuits and Systems, vol. 2, May 1989, pp. 1336–1339.

*A Fast Search Strategy in a Large Vocabulary Word Recognizer*, V.N. Gupta et al., INRS–Telecommunications, J. Acoust. Soc. Am. 84(6), Dec. 1988, pp. 2007–2017.

*Unleashing the Potential of Human–to–Machine Communication*, Lennig et al., Teleis, Issue 97, 1993, pp. 23–27.

*An Introduction to Hidden Markov Models*, L.R. Rabiner and B.H. Juang, IEEE ASSP Magazine, Jan. 1986, pp. 4–16.

Putting speech Recognition to Work in the Telephoen Network, Matthew Lenning, Proc. of IEEE, Aug. 1990, pp. 35–40.

*Comparison of Parametric Representations for Monosyllabic Word Recognition in Continuously Spoken Sentences*, Steven B. Davies and Paul Mermelstein, IEEE Trans. ASSP, ASSP–28, 1980, pp. 357–366.

*Primary Examiner*—David R. Hudspeth
*Assistant Examiner*—Donald L. Storm

[57] ABSTRACT

The invention relates to a method and apparatus for generating noise-attenuated feature vectors for use in recognizing speech, more particularly to a system and method providing a feature set for speech recognition that is robust to adverse noise conditions. This is done by receiving, through an input, a set of signal frames, at least some containing speech sounds, and then classifying the frames in the set of signal frames into classification groups on the basis of their energy levels. Each classification group is characterized by a mean energy value. In a specific example of implementation, the invention makes use of channel energy values to condition the frames in the set of signal frames. The frames in the set of signal frames are attenuated or noise reduced by altering the energy of the frames on the basis of the frames containing non-speech sounds. In a specific example of implementation, the invention compresses the energy of the frames in the set of signal frames such that the energy lies within a range. The invention also allows separate energy ranges to be defined for each channel.

27 Claims, 7 Drawing Sheets

U.S. PATENT DOCUMENTS

| | | | |
|---|---|---|---|
| 5,097,509 | 3/1992 | Lennig | 704/240 |
| 5,127,055 | 6/1992 | Larkey | 704/244 |
| 5,163,083 | 11/1992 | Dowden et al. | 379/88.03 |
| 5,181,237 | 1/1993 | Dowden et al. | 379/88.03 |
| 5,204,894 | 4/1993 | Darden | 379/88.03 |
| 5,212,764 | 5/1993 | Ariyoshi | 704/233 |
| 5,274,695 | 12/1993 | Green | 379/88.02 |
| 5,307,444 | 4/1994 | Tsuboka | 706/250 |
| 5,488,652 | 1/1996 | Bielby et al. | 379/88.03 |
| 5,515,475 | 5/1996 | Gupta et al. | 704/242 |
| 5,732,388 | 3/1998 | Hoege et al. | 704/205 |

METHOD AND APPARATUS FOR PROVIDING AN IMPROVED FEATURE SET IN SPEECH RECOGNITION BY PERFORMING NOISE CANCELLATION AND BACKGROUND MASKING

FIELD OF THE INVENTION

This invention relates to a method and an apparatus for automatically performing desired actions in response to spoken requests. It is applicable to speech recognition systems and may be used to allow voice activated dialling (VAD), credit card number identification, flight information and other services. It is also applicable to wireless systems and other systems where noisy environments require robust speech recognition systems.

BACKGROUND OF THE INVENTION

In addition to providing printed telephone directories, telephone companies provide information services to their subscribers. The services may include stock quotes, directory assistance and many others. In most of these applications, when the information requested can be expressed as a number or number sequence, the user is required to enter his request via a touch tone telephone. This is often aggravating for the user since he is usually obliged to make repetitive entries in order to obtain a single answer. This situation becomes even more difficult when the input information is a word or phrase. In these situations, the involvement of a human operator may be required to complete the desired task.

Because telephone companies are likely to handle a very large number of calls per year, the associated labour costs are very significant. Consequently, telephone companies and telephone equipment manufacturers have devoted considerable efforts to the development of systems which reduce the labour costs associated with providing information services on the telephone network. These efforts comprise the development of sophisticated speech processing and recognition systems that can be used in the context of telephone networks.

In a typical speech recognition system the user enters his request using isolated word, connected word or continuous speech via a microphone or telephone set. The request may be a name, a city or any other type of information for which either a function is to be performed or information is to be supplied- If valid speech is detected, the speech recognition layer of the system is invoked in an attempt to recognize the unknown utterance. The speech recognition process can be split into two steps namely a pre-processing step and a search step. The pre-processing step, also called the acoustic processor, performs the segmentation, the normolisation and the parameterisation of the input signal waveform. Its purpose is traditionally to transform the incoming utterance into a form that facilitates speech recognition. Typically at this step feature vectors are generated. Feature vectors are used to identify speech characteristics such as formant frequencies, fricative, silence, voicing and so on. Therefore, these feature vectors can be used to identify the spoken utterance. The second step in the speech recognition process, the search step, includes a speech recognition dictionary that is scored in order to find possible matches to the spoken utterance based on the feature vectors generated in the pre-processing step. The search may be done in several steps in order to maximise the probability of obtaining the correct result in the shortest possible time and most preferably in real-time. Typically, in a first pass search, a fast match algorithm is used to select the top N orthographies from a speech recognition dictionary. In a second pass search the individual orthographies are re-scored using more precise likelihood calculations.

The performance of automatic speech recognisers depends significantly on various environmental factors such as additive noise, echoes, transmission and transducer characteristics, as well as the level of background speech and speech like sounds. These distortions are carried in the parameters and features of the input speech and can significantly alter the recognition results. In order to build speech recognisers that are robust under adverse operating conditions, data representing these conditions must be used to train the speech recognition models. However, in certain applications, such as telephone applications, the speech-input conditions are not known in advance and cannot be controlled. For example the caller may be calling from a restaurant or from a busy conference hall where the noise may significantly affect the speech recognition process.

Thus, there exists a need in the industry to refine the speech recognition process such as to obtain a more robust speech recognition apparatus in the presence of noise and background speech.

OBJECTS AND STATEMENT OF THE INVENTION

An object of the invention is to provide a method and apparatus for performing signal processing, particularly useful in the context of speech recognition that reduces the perceptual effect of noise in the signal.

As embodied and broadly described herein the invention provides a signal processing device for generating noise-attenuated feature vectors, said signal processing device implementing functional blocks, comprising:

an input for receiving a set of signal frames, at least some of the frames of said set containing speech sounds and at least some of the frames of said set containing non-speech sounds;

frame classification means in operative relationship with said input for distinguishing frames containing speech sounds from frames containing non-speech sounds in said set;

noise attenuation means for conditioning parameters characterising frames containing speech sounds on the basis of parameters characterising frames containing non-speech sounds to attenuate a noise component in the frames containing speech sounds;

means for computing noise attenuated feature vectors of the frames containing speech sounds conditioned by said noise attenuation means.

For the purpose of this specification the expression "feature vector" is used to designate a group of entries and/or numbers describing the characteristics of a specific frame of the speech utterance.

For the purpose of this specification, the expression "non-speech sound" is used to designate sounds that are normally less intense than the speech sound in the utterance and typically contain noise.

In the most preferred embodiment of this invention, the signal processing apparatus is used in a speech recognition system that provides voice-activated dialing functions. From a functional point of view, a voice-activated dialing system attempts to connect a user via the telephone network to another individual on the basis of voice-only commands. Typically, the voice-activated dialing system is integrated into the telephone network such that subscribers are immediately connected to the system on off-hook. In the preferred embodiment, the voice activated dialing system provides three main functions, all of which are accessed via voice commands First, programmable subscriber-dependent directories allow telephone numbers to be associated with keywords. Second, a telephone connection can be made to a telephone number in the programmed directory via the utterance of its associated keywords. Finally, a mechanism exists to access numbers outside of the programmable subscriber-dependent directory, either by saying the number to be called, or by a fallback to the conventional dialing system. Such voice-activated systems are particularly useful to individuals using telephones in their automobiles, or other hands-busy, eyes-busy environments Once the voice-activated dialing system receives a request from the user, the system will first issue a prompt over the telephone network requesting the user to specify the keyword associated to the telephone number he seeks. If valid speech is detected in response to this prompt, a speech recognition layer is invoked that selects from a speech recognition dictionary an orthography that is most likely to match the spoken utterance. The speech utterance is first sampled at a rate at least equal to the Nyquist rate. In the case of telephone speech this rate is 8000 Hz. The digital samples are then segmented into frames of 204 samples on which the analysis will take place. Following this, the power spectrum is computed for each frame by first computing an FFT followed by a power computation, In the preferred embodiment, the FFT is computed using 256 points getting 128 independent power values. Using this power spectrum, channel energies are computed by passing the spectrum through a triangular filter bank. In the preferred embodiment, there are 20 triangular filters linearly spaced in frequency until 1000 Hz and logarithmically at higher frequencies. These channel energies are then used to classify each frame in the utterance into one of three possible categories: silence, unvoiced speech or voiced speech. The frames with the lower energies go into the silence category, those with medium energies go into the unvoiced speech category and the remainder go into the voiced speech category. This is done for all the frames in the utterance, which is typically 1 to 3 seconds in duration. Following this, the average of each of the channel energies of the frames in the silence category is subtracted from each channel energy value of all the frames in the utterance to mitigate the effect of background noise, yielding modified channel energies. The modified channel energies are then normalized to lie within a fixed range in order to minimize variations due to amplitude within a channel. Following this, log channel energies are computed followed by a re-normalization step, herein referred to as background masking. During background masking the low energy portions of the signal are suppressed since speech-like background noise will typically have a weaker energy than foreground speech. The result of background masking is then processed to compute mel-based cepstral parameters by performing a discrete cosine transform.

As embodied and broadly described herein the invention provides a method for processing a signal to generate noise-attenuated feature vectors, said method comprising the steps of:
   receiving a set of signal frames, at least some of the frames of said set containing speech sounds and at least some of the frames of said set containing non-speech sounds;
   distinguishing frames containing speech sounds from frames containing non-speech sounds in said set;
   conditioning parameters characterising frames containing speech sounds on the basis of parameters characterising frames containing non-speech sounds to reduce a perceptual effect of a noise component in the frames containing speech sounds;
   computing noise attenuated feature vectors of the frames containing sounds conditioned on the basis of parameters of frames containing non-speech sounds.

As embodied and broadly described herein, the invention also provides a speech recognition device implementing functional blocks, comprising:
   a signal processing and noise attenuation stage, including:
      an input for receiving a spoken utterance;
      means for grouping digital samples of a signal representative of said spoken utterance into a set of signal frames, at least some of the frames of said set containing speech sounds and at least some of the frames of said set containing non-speech sounds;
      frame classification means for distinguishing frames containing speech sounds from frames containing non-speech sounds in said set;
      noise attenuation means for conditioning parameters characterising frames containing speech sounds on the basis of parameters characterising frames containing non-speech sounds to attenuate a noise component in the frames containing speech sounds;
      means for computing noise attenuated feature vectors of the frames containing speech sounds conditioned by said noise attenuation means;
   a speech recognition dictionary containing a plurality of orthographies potentially recognisable on a basis of a set of noise attenuated feature vectors;
   search means for searching said dictionary on a basis of a set of noise attenuated feature rectors output by said means for computing noise attenuated feature vectors.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

Figure 1:
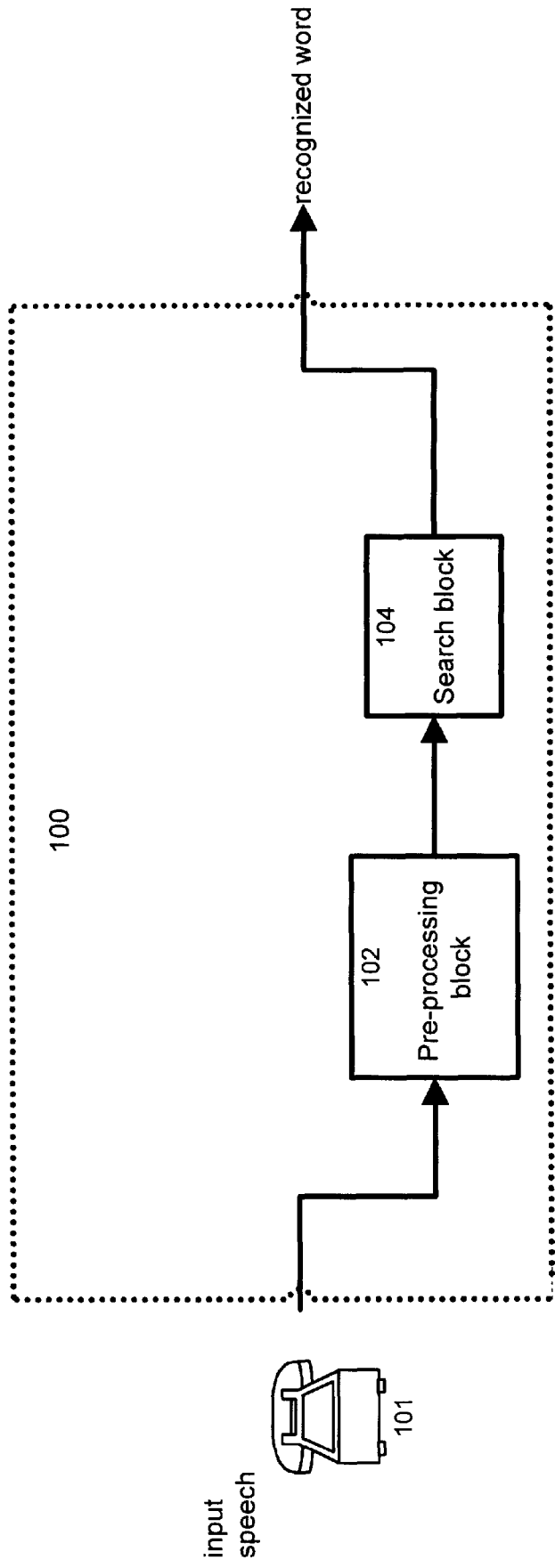
FIG. 1 is a simplified functional block diagram of a speech recognition system.

Speech recognition systems have been developed in many parts of the world and, although it is difficult to describe a standard recognition system architecture, some characteristics are shared between many of them. A typical speech recognition system of the type depicted in FIG. 1 generally comprises a device such as a microphone or telephone set 101 to convert the spoken utterance into an electric signal and transmit the signal to the speech recognition unit 100. The speech recognition unit 100 can be split into two functional blocks namely a pre-processing block 102 and a search unit 104. The pre-processing unit 102, also called the acoustic processor, performs the segmentation, the normalisation and the parameterisation of the input signal waveform As a result, this block 102 produces a series of vectors which describe the characteristics of the speech signal. The search block 104 includes a speech recognition dictionary that is scored in order to find possible matches to the spoken utterance. The search may be done in several steps in order to maximise the probability of obtaining the correct result in the shortest possible time and most preferably in real-time In order to obtain information about the search block of the speech recognition process, the reader is invited to consult the following prior art publications whose contents are hereby incorporated by reference.

U.S. PATENTS

| U.S. Pat. No. | INVENTOR |
| --- | --- |
| 5,488,652 | Gregory, J. Bielby et al. |
| 4,164,025 | Dubnowski et al. |
| 4,751,737 | Gerson et al. |
| 4,797,910 | Daudelin |
| 4,959,855 | Daudelin |
| 4,979,206 | Padden et al. |
| 5,050,215 | Nishimura |
| 5,052,038 | Shepard |
| 5,091,947 | Anyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,695 | Green |
| 5,307,444 | Tsuboka |
| 5,086,479 | Takenaga et al. |
| 5,515,475 | Gupta V. N. & Lennig M. |

OTHER ART

| TITLE | AUTHOR | SOURCE |
| --- | --- | --- |
| Dynamic Adaptation of Hidden Markov Model for Robust Speech Recognition | | 1989, IEEE International Symposium on Circuits and Systems, vol. 2, May 1989 pp. 1336–1339 |
| Dynamic Modification of the Vocabulary of a Speech Recognition Machine | | IBM Technical Disclosure Bulletin, vol. 27, No. 7A, Dec. 1984 |
| Adaptive Acquisition of Language | Gorin et al. | Computer Speech and Language, vol. 5, No. 2 Apr. 1991, London, GB, pp. 101–132 |
| Automated Bilingual Directory Assistance Trial in Bell Canada | Lennig et al. | IEEE Workshop on Interactive Voice Technology for Telecom Applications, Piscataway, NJ. Oct. 1992 |
| Unleashing The Potential of Human-To-Machine Communication | Labov and Lennig | Telesis, Issue 97, 1993, pp. 23–27 |
| An introduction To Hidden Markov Models | Rabiner and Juang | IEEE ASSP Magazine, Jan. 1986, pp. 4–16 |
| Putting Speech Recognition to Work in The Telephone Network | Lennig | Computer, published by IEEE Computer Society, vol. 23, No. 8, Aug. 1990 |
| Flexible Vocabulary Recognition of Speech Over The Telephone | Lennig et al. | IEEE Workshop on Interactive Voice Technology for Telecom Applications, Piscataway, NJ, Oct. 1992 |
| Mobile Robot Control by a Structural Hierarchical Neural Network | | Nagata et al. pp. 69–76, 1989 |
| Large Vocabulary Continuous Speech Recognition: a Review | Steven Young | IEEE Automatic Speech Recognition Workshop, September 16, 1995 |
| Putting Speech Recognition to Work in the Telephone Network | Matthew Lennig | IEEE (August 1990) reprinted from Computer |
| "A fast search strategy in a large vocabulary word recogniser" | Gupta V. N. Lennig M., Mermelstein P. | INRS-Telecommunications, J. Acoust. Soc. Am. 84 (6), December 1988, p. 2007 |

Figure 2:
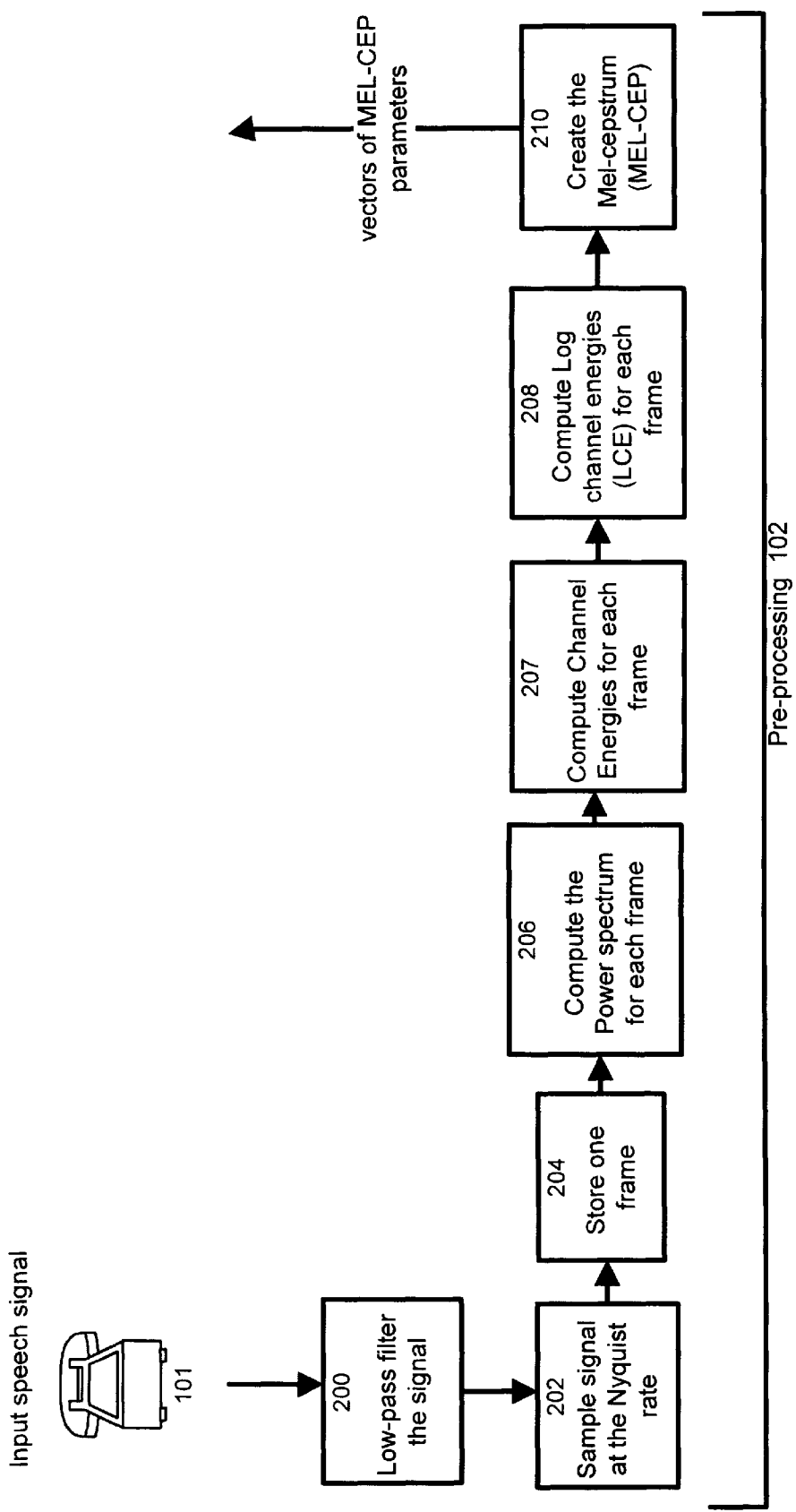
FIG. 2 is a detailed functional block diagram of a pre-processing module of a prior art speech recognition system.

The purpose of a typical prior art pre-processing module 102, illustrated in greater detail in FIG. 2, is to translate the incoming signal into a form that will facilitate speech recognition. As show, this module comprises a number of steps. The first two 200 and 202 are used to create a digital version of the incoming signal. This is done by first eliminating frequencies lying beyond the range of interest 200 and then sampling the signal at a rate at least equal to the Nyquist rate 202 to obtain a digital sample. These samples are then typically stored into frames The following block 206 computes the power spectrum on each of these frames followed by a channel energy computation 207 and a log channel energy computation 208. These processing methods are well known in the art to which this invention pertains The reader is invited to consult O'Shawnessey D. (1990) "Speech Communication: Human and Machine", Addison-Wesley Addison-Wesley series in Electrical Engineering: Digital Signal Processing, whose content is hereby incorporated by reference. Finally taking the discrete cosine transform of the log channel energies generates the mel-based cepstral parameters. These cepstral parameters for one frame are then grouped into what is commonly known as a feature vector. A feature vector may be composed of any number of entries. Commonly they include 15 elements that are constructed from mel-based cepstral coefficients. The first seven elements of the feature vector, often referred to as the static parameters, are the cepstral coefficients $c_1, \ldots, c_7$. The remaining eight elements, often called dynamic parameters, are often designated as $\delta c_0, \ldots, \delta c_7$ and are estimated from the first derivative of each cepstral coefficient These parameters are then sent to the search block 104 of the speech recognition module in order to find an orthography in the dictionary most likely to correspond to the speech utterance by performing some computation with the parameters.

Pre-processing units of the type described above have been used in the past to provide feature vectors for speech recognition. However many speech recognition applications must operate in real world situations where the presence of background noise, echoes, transmission line characteristics and other speech-like sound may interfere with the recognition process This implies that the speech models used for recognition be trained in the conditions in which the systems will operate. These situations may not always be predictable as for the case of telephone operations Systems that adapt to environmental conditions are required.

In a most preferred embodiment, the present invention provides a signal processing stage that identifies the lowest energy of an utterance and removes it from all components, normalises the signal to a given range and masks the speech-like background interference, to provide noise cancelled feature vectors. These noise cancelled feature vectors can be subsequently used by the search stage of a speech recognition apparatus with little or no modification to provide an improved and more robust speech recognition system.

Figure 3:
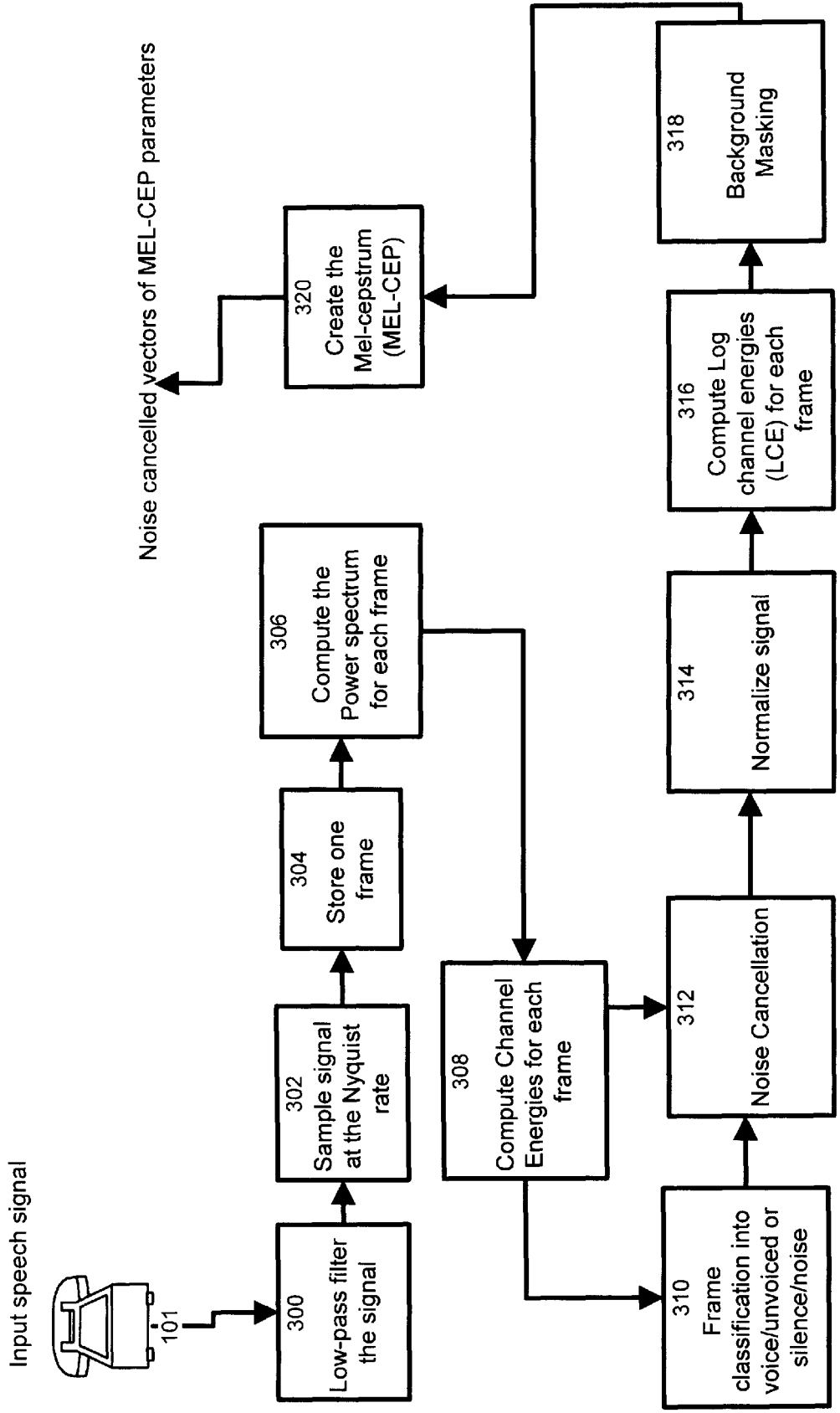
FIG. 3 is a detailed functional block diagram of a pre-processing module in accordance with an embodiment of the invention.

In the preferred embodiment of this invention, shown in FIG. 3, the pre-processing module comprises explicit functional blocks to eliminate additive background noise. Preferably, these operations are done using real time computations such as to minimise the amount to time a user must wait for the system to recognise the uttered speech.

The first block, usually referred to as the anti-aliasing low-pass filter 300, is used to eliminate frequencies outside the range of interest thereby eliminating or reducing the effect of aliasing when an analog signal is converted to digital format. By the Nyquist theorem, the cut-off frequency of the filter should be half that of the sampling frequency. In the case of a telephone network application, the cut-off is generally about 3400 Hz (at −3 dB) which allows a sampling rate as low as 8000 Hz taking into account channel roll-off- This operation is very well known in the art of signal processing and as a reference the reader may choose to consult "Discrete-Time Processing of Speech Signals" by Deller, Proakis and Hansen, Macmillan Publishing Company New York 1993 whose content is hereby incorporated by reference.

The second block, usually referred to as the analog to digital converter 302, consists of sampling the incoming analog signal to produce a digital version of it. Sampling is usually performed at a rate at least equal to the Nyquist rate such as to avoid the possibility of aliasing. In the context of a telephone network this rate is usually 8000 samples/second. Typical digital representations that could be used in the context of speech recognition include Pulse Code Modulated signals (PCM), differential PCM (DPCM) and Adaptive Delta Modulation (ADM). Many coding schemes exist and are used for various reasons such as efficiency, compactness, simplicity and others. The most preferred embodiment of this invention uses the PCM coding scheme. The analog to digital conversion process is well known in the art of signal processing and telecommunications Further information on PCM and other coding techniques can be obtained on this topic in "Discrete-Time Processing of Speech Signals" by Deller, Proakis and Hansen, Macmillan Publishing Company New York 1993 whose content is hereby incorporated by reference. Note here that in the case the input signal is in digital format, the A/D converter 302 and the low-pass filter 300 are omitted.

The digital samples obtained from the A/D converter 302 are then grouped into analysis frames in a frame buffer 304. Preferably these analysis frames have a duration ranging from 5–20 ms. All further processing is done relative to these frames. The preferred embodiment of this invention transforms the digitised signal into feature vectors and more specifically mel-based cepstral vectors. The steps that follow describe the processes involved in generating noise cancelled mel-based feature vectors.

The power spectrum module 306 computes the power spectrum for each frame. This is generally done by first computing an FFT on the digital signal followed by a power computation. Usually a 256 point FFT is sufficient to give sufficient spectral precision although an FFT computed with a lower or greater number of points may also be used. The FFT computation is usually performed by the following equation:

$$Y(k) = \sum_{n=0}^{N_w-1} y(n)w(n)e^{-j2\pi n \frac{k}{K}} \qquad k = 1, \ldots K-1 \qquad \text{Equation 1}$$

Where y(n) is the input digital signal, K is the number of points in the FFT computation, $N_w$ is the number of samples in a frame and w(n) is a Hanning window given by the equation:

$$w(n) = \frac{1}{2} - \frac{1}{2}\cos\left(\frac{2\pi n}{N_w - 1}\right) \qquad n = 0, \ldots, N_w - 1 \qquad \text{Equation 2}$$

Figure 4:
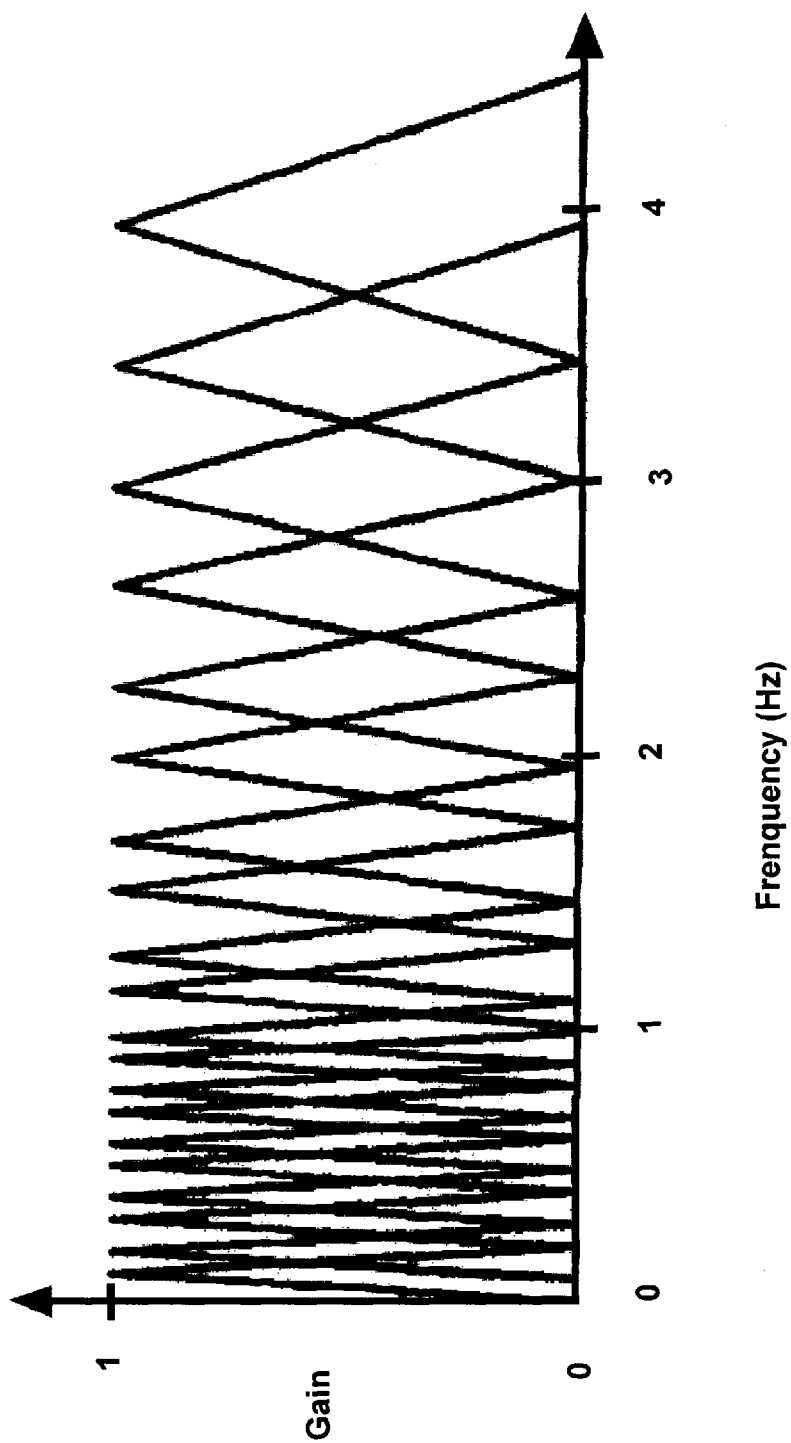
FIG. 4 is the frequency spectrum of the filter banks for computing channel energies.

Finally the power is computed by the following computation:

$$P(k) = \frac{|Y(k)|^2}{f_s^2} \qquad \text{Equation 3}$$

Where $f_s$ is the sampling frequency of the A/D converter used as a normalisation factor for the power computation Channel energies (CE) are then computed by the following block 308. This operation is usually performed by passing the power spectrum computed in the previous step 306 through a filter bank An example of a triangular filter bank is shown in FIG. 4. In the preferred embodiment, there are 20 triangular filters linearly spaced in frequency until 100 Hz and logarithmically at higher frequencies. This leads to filter bandwidths of about 100 Hz in the first formant frequency region at up to 500–1000 Hz at higher frequencies Other types of filter banks which weigh all frequency components equally may be used as well without detracting from the spirit of the invention. The preferred method is described in detail in S. Davis & P. Mermelstein (1980) "Comparison of parametric representation for monosyllabic word recognition in continuously spoken sentences," IEEE Trans. ASSP, ASSP-28, 357–366 whose content is hereby incorporated by reference. These filter banks provide frequency (to follow the bark or critical-band scale) and amplitude (logarithmic scale) warping in order to weigh each frequency band according to its relative importance in the recognition process. The following equations are used to compute the CEs (channel energies):

$$E_j \sum_{k=0}^{\frac{K}{2}-1} \phi_j(k) P(k) \quad 1 \le j \le 20 \quad \text{Equation 4}$$

where j is the channel index, $E_j$ is the channel energy for the jth channel, K is the number of points in the FFT and the triangular weighting function $\phi_j(k)$ is given by:

$$\phi_j(k) = \begin{cases} \beta_j \dfrac{(k\Delta - f_{lj})}{(f_{cj} - f_{lj})} & f_{lj} \le k\Delta \le f_{cj} \\ \beta_j \dfrac{(f_{uj} - k\Delta)}{(f_{uj} - f_{cj})} & f_{cj} \le k\Delta \le f_{uj} \\ 0 & \text{otherwise} \end{cases} \quad \text{Equation 5}$$

In the above, $\Delta = f_s/K$ ($f_s$ is the sampling frequency), and $f_{lj}$, $f_{cj}$ and $f_{uj}$, denote the lower, centre and upper frequencies of the jth triangular filter. Finally $\mu_j$ is a normalisation factor such that:

$$\sum_{k=0}^{\frac{K}{2}-1} \phi_j(k) = 1 \quad 1 \le j \le 20 \quad \text{Equation 6}$$

Figure 5:
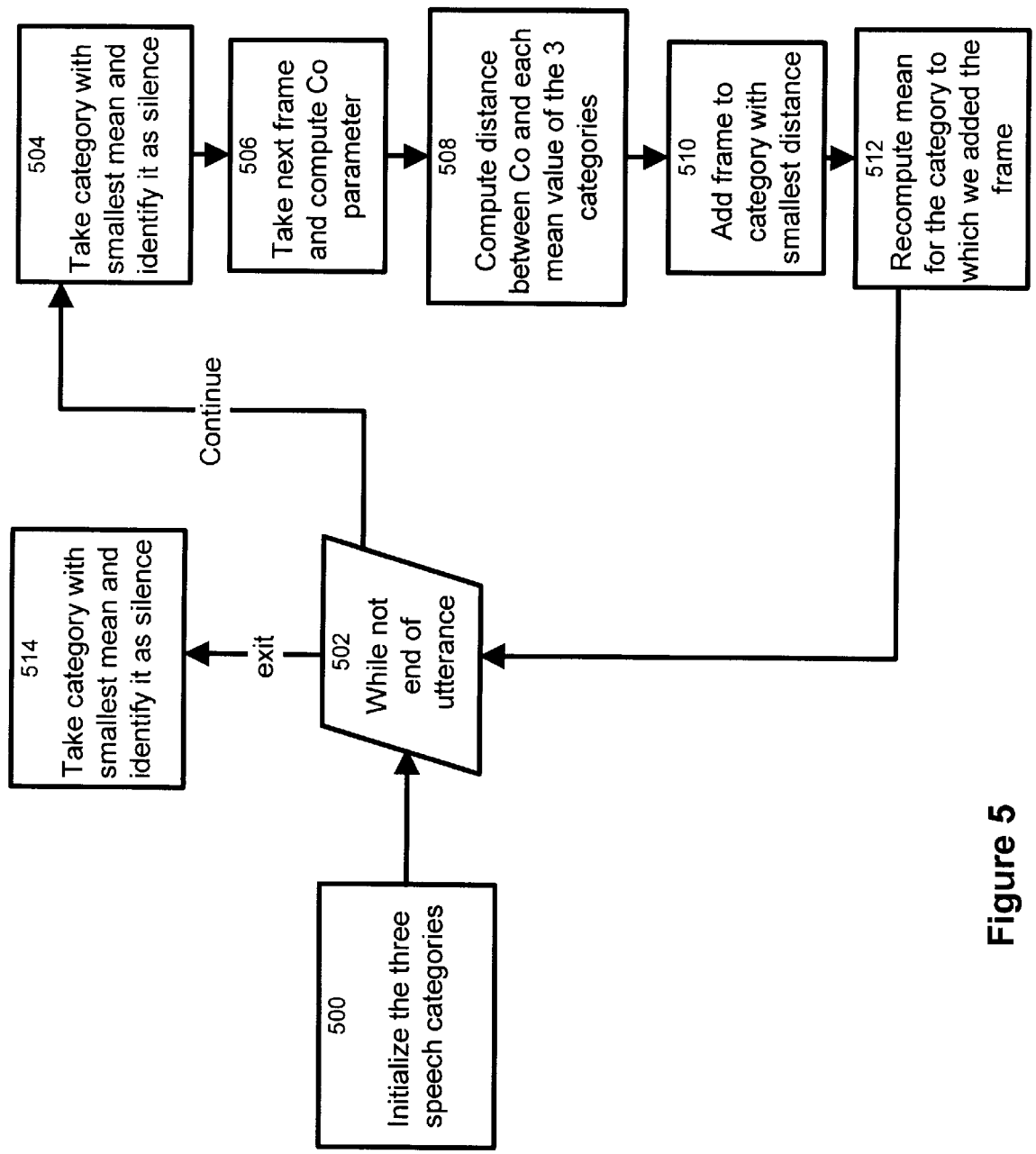
FIG. 5 is a flow chart illustrating the classification of the frames in silence, unvoiced and voiced speech in accordance with the embodiment of this invention.

The following block, designated as frame classification block 310, classifies each frame into one of three possible categories based on the total energy in the frame. The total energy in a frame is the $c_o$ Mel-based cepstral coefficient. In the preferred embodiment these categories are silence, voiced speech and unvoiced speech. The classification process is shown in detail in FIG. 5. The first step 500 involves initialising the three mean energies of the three groups namely the silence, non-voiced speech and speech groups. The frames are first analysed and the mean energy value of the silence category is set to the total energy of the lowest energy frame. This assumption is likely to be correct almost all the time since a spoken utterance will always contain at least one frame of silence. Following this, the mean energy value of the voiced speech category is set to the total energy of the highest energy frame. Finally the mean energy of the unvoiced speech category is set to the average value of the mean energies of silence and voiced speech categories. An iteration is then performed while the end of the utterance has not been reached 502, during which a series of operations is applied on each frame. The group with the lowest energy value is classified as silence 504. The co mel-based cepstral parameter is then computed 506 on the frame being analysed. The co parameter represents the total energy in the frame. This parameter is computed using the following equations:

$$c_0 = \log\left(\sum_{k=0}^{20} \alpha_k E_k\right) \quad \text{Equation 7}$$

where $E_k$ are the channel energies (CE) and $\alpha_k$ are weights chosen such as to reduce edge effect in the LCE computations and to down weight channels which typically contain noise components, Once the $c_o$ value is computed for the frame, the distance between $c_o$ and the mean value for each category is computed 508 and that frame is placed in the category to which it is most likely to correspond 510. A large number of methods can be used to compute this distance. For example one may use the simple Euclidean distance. Methods for computing the distance differing from the one mentioned do not detract from the spirit of the invention. A new mean energy value is then computed 512 for the category to which the frame was added. The cycle then continues until the end of the utterance has been reached 502. When the end of the utterance is reached, the category with the smallest mean energy is identified as a silence 514.

Figure 7:
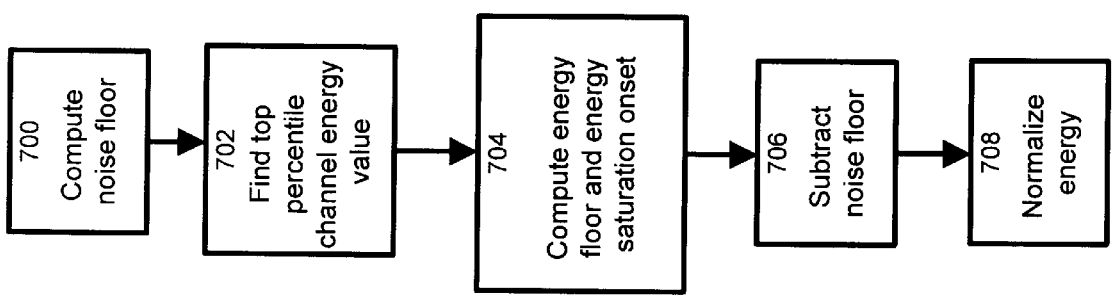
FIG. 7 is a flow chart illustrating the combined operation of noise subtraction and dynamic range compression in accordance with an embodiment of the invention.

The following two functional blocks, designated as noise cancellation 312 and normalisation 314 blocks, perform operations that consist in subtracting the mean of the channel energies of the frames of the silence category from every frame and normalising the channel energies of all frames to lie within a fixed dynamic range. These two operation, noise cancellation and signal normalisation can be performed concurrently or one after the other without detracting from the spirit of the invention. When performing the operations concurrently, the procedure, illustrated in FIG. 7, first involves identifying the noise floor 700 for each channel as a scaled mean of the energy values for that channel from the frames assigned to the silence category or the lowest channel energy in the entire utterance for each channel respectively.

As previously mentioned, the energy in each channel is preferably made to lie in a fixed dynamic range and any value that is smaller than some threshold (from hereon referred to as the saturation onset $E_{o,j}$) is put through a non-linear function to compress the scale. In the preferred embodiment the dynamic range is set to lie within 38 dB and all the energy values below the saturation onset $E_{o,j}$ are made to lie within a 10 dB range. Mathematically this operation can be performed in four steps. The first is to find the maximum channel energy 702 across all the utterance frames and for each channel. Mathematically this can be expressed as:

$$E_{j,\max} = \max_t E_j(t) \quad \text{Equation 8}$$

Figure 6:
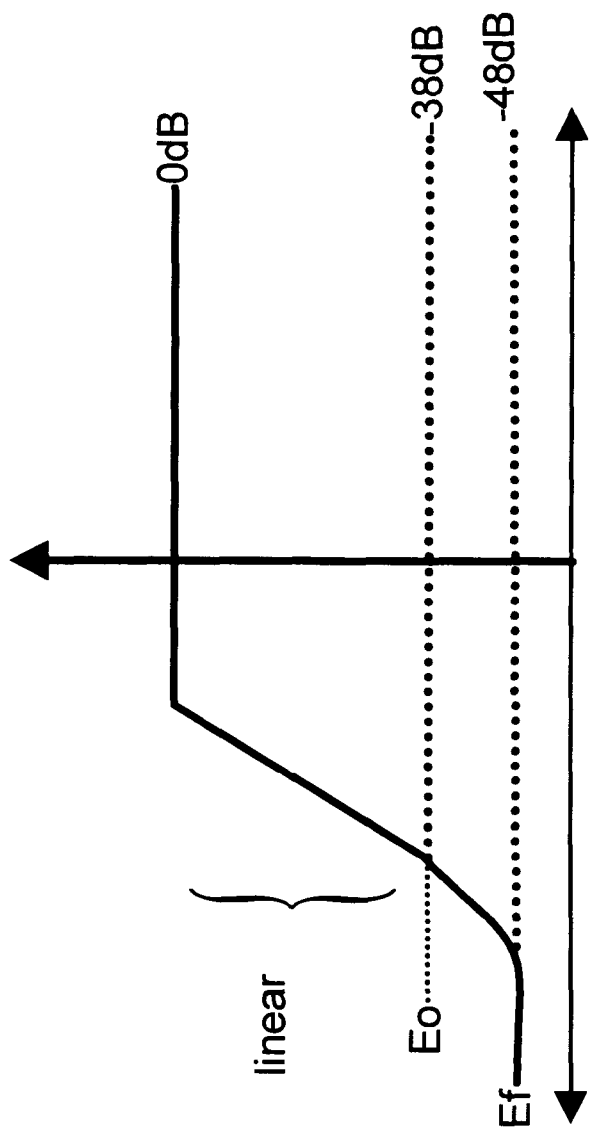
FIG. 6 is an input/output characteristic curve showing the position of the energy floor and the saturation onset after the compression of the channel energies into a fixed dynamic range.

The second step is to define an energy floor $E_{F,j}$ and a saturation onset $E_{o,j}$ 704 between which the signal will lie. The positions of these two values are shown graphically in FIG. 6. As an example, $E_{F,j}$ and $E_{o,j}$ can be computed as follows:

$$E_{F,j} = \frac{E_{j,\max}}{10^{4.8}} \quad \text{Equation 9}$$

$$E_{o,j} = \frac{E_{j,\max}}{10^{3.8}}$$

Where $10^{4.8}$ and $10^{3.8}$ correspond to 48 dB and 38 dB respectively. The last two steps involve subtracting the noise floor 706 from each of the channel energies and nomnalising the signal 708 to lie in a fixed dynamic range. Mathematically this operation can be expressed as follows:

$$\check{E}_j(t) = \begin{cases} E_{F,j} & (E_j(t) - \sigma_j^2) < 0 \\ E_{F,j} + \frac{(E_{o,j} - E_{F,j})}{E_{o,j}}(E_j(t) - \sigma_j^2) & E_{F,j} < (E_j(t) - \sigma_j^2) < E_{o,j} \\ (E_j(t) - \sigma_j^2) & (E_j(t) - \sigma_j^2) \geq E_{o,j} \end{cases}$$ Equation 10

As a variant a single noise floor $\sigma^2$ could model the noise floor for all the channels The procedure implies finding the maximum channel energy across all channels and afterward computing all other results using the single noise floor $\sigma^2$. This would allow to model white noise sources instead of coloured noise.

The next block 316 computes the Log Channel Energies (LCE). The LCEs are computed by using the following equations:

$$L_j = \max(\gamma_j, \log_{10}(\check{E}_j)) \quad 1 \leq j \leq 20 \quad \text{Equation 11}$$

$$L_0 = \max\left(\gamma_0, \log\left(\sum_{k=0}^{20} \alpha_k \check{E}_j\right)\right)$$

where $\check{E}$ are the noise cancelled channel energies, $\gamma_j$ is the minimum LCE values for the jth channel and $\alpha_k$ are weights chosen such as to reduce edge effect in the LCE computations. Because of the property of the logarithm, the multiplicative effects of the channel in the spectral domain is replaced by an additive factor and therefore the different components of a signal can be more easily identified.

The next block 318, designated as background masking, removes or attenuates the effects of additive background that is often speech-like. For example, there may be people talking in the background while someone is making a phone call. These voices have frequency components that are located in the range of interest for speech. Furthermore these voices may be at higher amplitudes than noise removed in the previous blocks 310 312 314. In the preferred embodiment, we assume that the background energy is weak compared to the foreground. The principle is to suppress the low energy portion of the signal thereby reducing the effect of the background. This is performed in three steps. The first is to calculate the maximum value of the noise-cancelled LCE:

$$L_{\max} = \max_{t,j} L_j(t) \quad \text{Equation 12}$$

Alternatively, any estimate of high percentile energy values can be used here without detracting from the spirit of the invention. The second step is to normalise the LCE by subtracting this value from each LCE:

$$\hat{L}_j(t) = L_j(t) - L_{\max} \quad \text{Equation 13}$$

Finally, the low energy region of the spectra is compressed. Many methods can be used to compress this region (linear, logarithmic . . . ). The preferred embodiment compresses the spectra using the following expression:

$$\check{L}_j(t) = \begin{cases} 0 & \hat{L}_j(t) > 0 \\ \hat{L}_j(t) & L_o < \hat{L}_j(t) \leq 0 \\ L_F + (L_o - L_F)\exp(\hat{L}_j(t) - L_o) & \hat{L}_j(t) \leq L_o \end{cases}$$ Equation 14

In the present embodiment the values of $L_F$ and $L_o$ are set of 4 and 5 respectively and designate the LCE floor and LCE onset respectively. Other values may be used provided $L_o > L_F$. The resulting values are the background masked LCE values. Alternatively a base of 10 can be used instead of the exponential (base e) in the above equation without detracting from the spirit of the invention.

The final block 320 computes the noise cancelled mel-based cepstral vector. This is performed by computing the Discrete Cosine Transform on the background masked LCE values obtained from the previous block 318. Typically, vectors containing a total of 15 parameters are generated per frame with seven (7) static parameters and the rest being dynamic parameters. Sample equations used to compute these parameters is shown below:

static parameters                                                         Equation 15

$$c_j = \begin{cases} \check{L}_0 & j = 0 \\ \sum_{k=1}^{20} \check{L}_k \cos\left((k - 0.5)\frac{\pi}{20}j\right) & 1 \leq j \leq 7 \end{cases}$$

dynamic parameters $$\delta c_j(t) = c_j(t+2) - c_j(t-2) \quad 0 \leq j \leq 7$$

These parameters are then sent to the search block of the speech recognition module in order to find an orthography in the dictionary most likely to correspond to the speech utterance by performing some computation with the parameters.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their eqivalents.

I claim:

1. A signal processing device for generating noise-attenuated feature vectors, said signal processing device implementing functional blocks, comprising:

an input for receiving an audio signal derived from a spoken utterance including a set of signal frames, at least some of the signal frames of the set containing speech sounds and at least some of the frames of the set containing non-speech sounds, the signal frames in the set containing speech sounds including noise components;

a frame classification unit coupled to said input for processing the set of signal frames in the audio signal applied at said input for generating a first subset of frames containing speech sounds and a second subset of frames containing non-speech sounds;

a noise attenuation unit for conditioning signal frames in the subset of frames containing speech sounds on a basis of signal frames in the subset of frames containing non-speech sounds to attenuate a noise component in the signal frames in the subset of frames containing speech sounds;

a processing unit for processing the signal frames in the set conditioned by said noise attenuation unit for computing noise attenuated feature vectors suitable for processing in a speech recognition unit for recognising the spoken utterance.

2. A signal processing device as defined in claim 1, wherein each signal frame in the set is characterised by a plurality of parameters, the plurality of parameters including channel energy values.

3. A signal processing device as defined in claim 2, wherein said frame classification unit classifies a given signal frame as containing non-speech sounds when an energy level value associated with the given signal frame is below a certain threshold.

4. A signal processing device as defined in claim 3, wherein said frame classification unit is operative to divide the set of signal frames in at least two classification groups on a basis of energy values of the signal frames in the set, each classification group being characterised by a mean energy value, the certain threshold being a value intermediate the mean energy values of two of the classification groups.

5. A signal processing device as defined in claim 2, wherein said noise attenuation unit includes an energy reduction unit for reducing channel energy values of signal frames in the subset of frames containing speech sounds by a degree related to the channel energy values of the signal frames in the subset of frames containing non-speech sounds.

6. A signal processing device as defined in claim 5, wherein said energy reduction unit subtracts a set of channel energy values derived from signal frames in the subset of frames containing non-speech sounds from the channel energy values in each signal frame in the subset of frames containing speech sounds.

7. A signal processing device as defined in claim 6, wherein said noise attenuation unit includes signal normalisation means for compressing a channel energy value in a given signal frame if the channel energy value in said given signal frame is outside a certain range.

8. A signal processing device as defined in claim 7, wherein said signal normalisation means compares every channel energy value in the given signal frame with a boundary of said range and compresses the channel energy value if the channel energy value is below the boundary.

9. A signal processing device as defined in claim 8, wherein the boundary is related to a channel energy value in a frame of said subset of frames containing speech sounds.

10. A signal processing device as defined in claim 9, wherein said boundary is related to a high channel energy value in said set.

11. A signal processing device as defined in claim 1, wherein said processing unit for computing noise attenuated feature vectors computes mel-based cepstral vectors.

12. A speech recognition device implementing functional blocks, comprising:
a signal processing and noise attenuation stage, including:
an input for receiving a signal representative of a spoken utterance;
a grouping unit operative for grouping digital samples of the signal representative of said spoken utterance into a set of signal frames, at least some of the signal frames of said set containing speech sounds and at least some of the signal frames of said set containing non-apeech sounds, the signal frames in the set containing speech sounds including noise components;
frame classification unit coupled to said input for processing the set of signal frames for generating a first subset of frames containing speech sounds and a second subset of frames containing non-speech sounds;
noise attenuation unit for conditioning signal frames in the subset of frames containing speech sounds on a basis of signal frames in the subset of frames containing non-speech sounsa to attenuate a noise component in the silgnal frames in the subset of frames containing speech sounds;
processing unit for computing noise attenuated feature vectors of the signal frames in the subset of frames containing speech sounds conditioned by said noise attenuation unit, said noise attenuated feature vectors being suitable for processing in a speech recognition unit for recognising the spoken utterance;
a speech recognlition dictionary containing a plutality of orthographies potentially recognisable on a basis of noise attenuated feature vectors;
a search unit for searching said dictionary on a basis of a set of noise attenuated feature vectors output by said means for computing noise attenuated feature vectors.

13. A speech recognition device as defined in claim 12, comprising an output for outputtilng an orthography from said speech recognition dictionary as being a likely match to a set of noise attenuated feature vector generated by said processing unit for computing noise attenuated feature vectors.

14. A method for processing a signal to generate noise-attenuated feature vectors, said method comprising the steps of:
receilving an audio signal derived from a spoken utterance including a set of signal frames, at least some of the signal frames of the set containing speech sounds and at least some of the frames of the set containing non-speech sounds, the signal frames in the set containing speech sounds including noise components;
processing the set of signal frames for generating a first subset of frames containing speech sounds and a second subset of frames containing non-speech sounds;
conditioning signal frames in the subset of frames containing speech sounds on a basis of signal frames in the subset of frames containing non-speech sounds to attenuate a noise component in the signal frames in the subset of frames containing speech sounds;
processing the conditioned signal frames for computing noise attenuated feature vectors suitable for processing in a speech recognition unit for recognising the spoken utterance.

15. A method as defined in claim 14, wherein each signal frame in the set is characterised by a plurality of parameters, the plurality of parameters including channel energy values.

16. A method as defined in claim 15, comprising the step of classifying a given signal frame as containing non-speech sounds when a signal energy level of said given signal frame is below a certain threshold.

17. A method as defined in claim 16, comprising the step of classifying a given signal frame in the subset of frames containing speech sounds when a signal energy level of said given signal frame is above a certain threshold.

18. A method as defined in claim 17, including a step of reducing channel energy values for signal frames in the subset of frames containing speech sounds by a degree related to the energies of the signal frames containing non-speech sounds.

19. A method as defined in claim 18, comprising a step of subtracting a channel energy value derived fromm a signal frame in the subset of frames containing non-speech sounds from every channel energy value in each signal frame om said set.

20. A method as defined in claim 19, comprising the step of compressing a channel energy value in a given signal frame if the channel energy value in said given signal frame is outside a certain range.

21. A method as defined in claim 20, comprising the step of comparing every channel energy value in said given signal frame with a boundary of said range and compressing the channel energy value if the channel energy value is below said boundary.

22. A method as defined in claim 21, wherein said boundary is related to a channel energy value in a signal frame of said subset of frames containing speech sounds.

23. A method as defined in claim 22, wherein said boundary is related to a high channel energy value in said set.

24. A method as defined in claim 15, comprising the step of modifying channel energy values of signal frames in said set in dependence of magnitudes of the channel energy values to selectively compress channel energy values associated with background noise components.

25. A signal processing device for generating noise-attenuated feature vectors, said signal processing device implementing functional blocks, comprising:
   input for receiving an audio signal derived from a spoken utterance including a succession of signal frames, at least some of the signal frames containing speech sounds and at least some of the signal frames containing non-speech sounds, the signal frames containing speech sounds including noise components;
   frame classification means coupled to said input for processing the succession of signal frames for generating a first set of frames containing speech sounds and a second set of frames containing non-speech sounds;
   noise attenuation means for conditioning signal frames in the set of frames containing speech sounds on a basis of signal frames in the set of frames containing non-speech sounds to attenuate a noise component in the set of frames containing speech sounds;
   means for processing the signal frames conditioned by said noise attenuation means for computing noise attenuated feature vectors suitable for processing in a speech recognition unit for recognising the spoken utterance.

26. A signal processing device for generating noise-attenuated feature vectors, said signal processing device implementing functional blocks, comprising:
   an input for receiving an audio signal derived from a spoken utterance including a set of signal frames, at least some of the signal frames of the set containing speech sounds and at least some of the frames of the set containing non-speech sounds, the signal frames in the set containing speech sounds including noise components;
   a frame classification unit coupled to said input for processing the set of signal frames in the audio signal applied at said input for generating a first subset of frames containing speech sounds and a second subset of frames containing non-speech sounds;
   a noise attenuation unit for performing a signal conditioning operation for conditioning signal frames in the subset of frames containing speech sounds on a basis of signal frames in the subset of frames containing non-speech sounds to attenuate a noise component in the signal frames in the subset of frames containing speech sounds, said signal conditioning operation being characterized in that a given frame in the subset of frames containing speech sounds is conditioned at least in part on a basis of a frame containing non-speech sounds and occurring subsequent the given frame in the audio signal;
   processing unit for processing the signal frames in the set conditioned by said noise attenuation unit for computing noise attenuated feature vectors suitable for processing in a speech recognition unit for recognising the spoken utterance.

27. A method for processing a signal to generate noise-attenuated feature vectors, said method comprising the steps of:
   receiving an audio signal derived from a spoken utterance including a set of signal frames, at least some of the signal frames of the set containing speech sounds and at least some of the frames of the set containing non-speech sounds, the signal frames in the set containing speech sounds including noise components;
   processing the set of signal frames in the audio signal applied at said input for generating a first subset of frames containing speech sounds and a second subset of frames containing non-speech sounds;
   conditioning signal frames in the subset of frames containing speech sounds on a basis of signal frames in the subset of frames containing non-speech sounds to attenuate a noise component in the signal frames in the subset of frames containing speech sounds, said signal conditioning operation being characterized in that a given frame in the subset of frames containing speech sounds is conditioned at least in part on a basis of a frame containing non-speech sounds and occurring subsequent the given frame in the audio signal;
   processing the conditioned signal frames for computing noise attenuated feature vectors suitable for processing in a speech recognition unit for recognising the spoken utterance.

* * * * *